April 20, 1943.  K. B. DAFFORN  2,317,033
THERMOSTAT STRUCTURE
Filed April 14, 1941
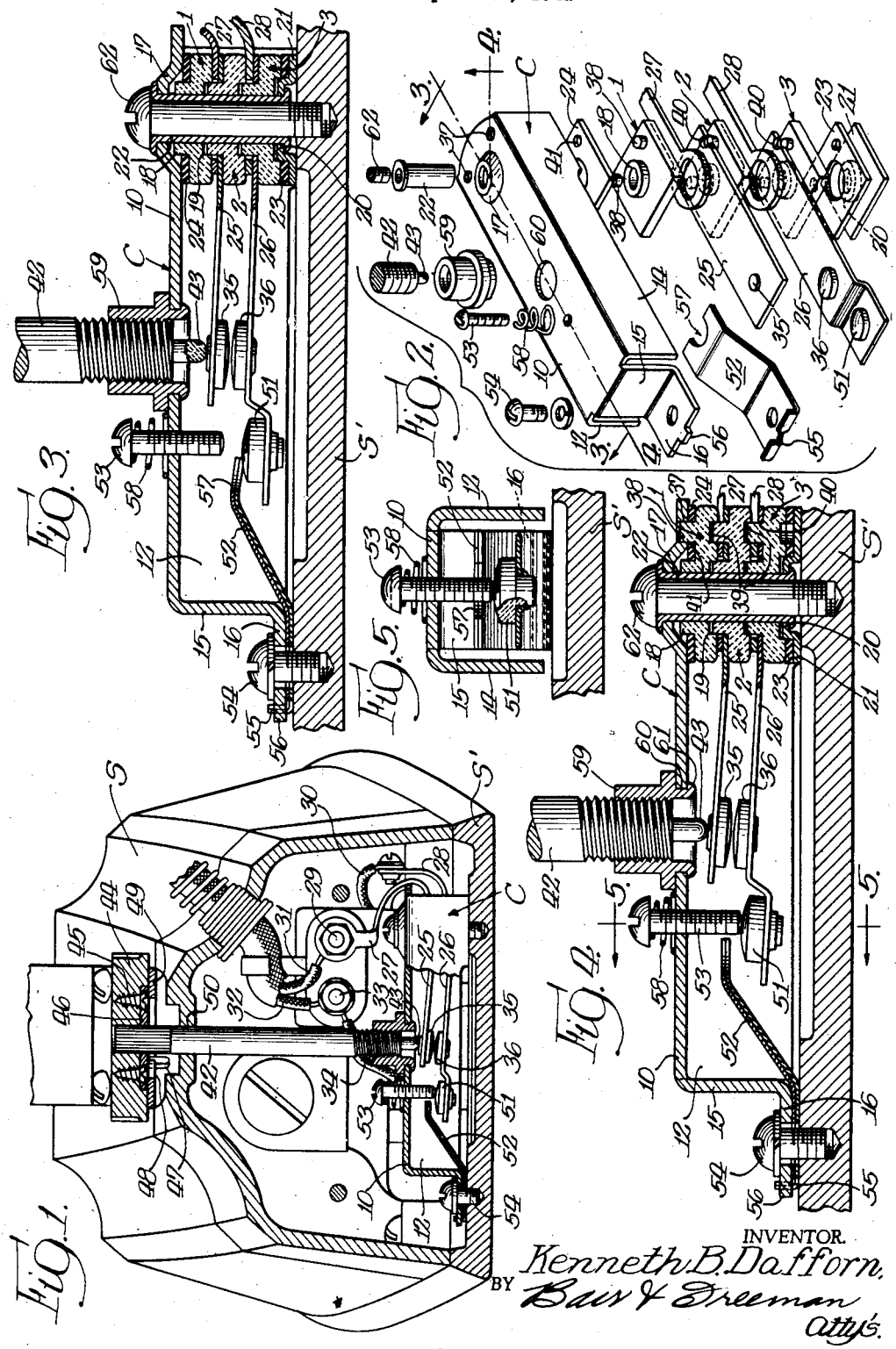
INVENTOR.
Kenneth B. Dafforn,
BY Bair & Freeman
Attys.

Patented Apr. 20, 1943

2,317,033

UNITED STATES PATENT OFFICE 2,317,033

THERMOSTAT STRUCTURE

Kenneth B. Dafforn, Dover, Ohio, assignor to Knapp-Monarch Company, St. Louis, Mo., a corporation of Missouri Application April 14, 1941, Serial No. 388,536

6 Claims. (Cl. 200—138)

My present invention relates to a thermostat structure for controlling electrically heated appliances, such as steam irons, sad irons, waffle irons and the like.

One object of the invention is to provide a thermostat assembly which may be secured to a surface from which heat is received for operating the thermostat and which includes an adjusting screw for the thermostat, the thermostat being designed to include an "off" position, as well as various adjusted positions.

A further object is to provide a thermostat having a channel shaped casing with the various parts of the thermostat mounted therein and the casing including a mounting ear to be secured adjacent the heated surface of the appliance, with the bimetal element of the thermostat interposed between the mounting ear and such surface.

Still a further object is to provide a thermostat wherein spring arms carry circuit controlling contacts and are biased to disengage each other, an adjusting screw being associated therewith to normally effect engagement except when the adjusting screw is rotated to a minimum or "off" position, a stop screw being engageable with one of the spring blades at such position to permit the same knob which is used for effecting adjustment to be also used as a manual circuit opening control.

Other objects are to provide a thermostat assembly wherein a plurality of stacked elements are secured as a unit with relation to the casing of the thermostat by a tubular rivet through which a mounting screw for one end of the thermostat extends, the stacked parts having cooperating elements to prevent rotation thereof and consequent grounding of the spring arms of the thermostat relative to the casing.

With these and other objects in view, my invention with respect to its features which I believe to be novel and patentable will be pointed out in the claims appended hereto. For a better detailed understanding of the invention, and further objects relative to details of economy of my invention, reference is made to the following description and to the accompanying drawing wherein such further objects will definitely appear, and in which Figure 1 is a transverse vertical sectional view through an iron such as one of the steam generating type shown in the copending application of Russell I. Huffman, Serial No. 381,871, filed March 5, 1941, with my thermostat mounted therein and shown partially in section;

Figure 2 is an exploded perspective view of my thermostat structure;

Figure 3 is an enlarged sectional view on the line 3—3 of Figure 2, showing the bimetal element in heated position and the thermostat contacts separated as a result thereof;

Figure 4 is a similar sectional view on the line 4—4 of Figure 2, showing the adjusting screw for the thermostat rotated to its "off" position, and Figure 5 is a sectional view on the line 5—5 of Figure 4.

On the accompanying drawing I have used the reference character S to indicate generally a sad iron, and S' the sole plate thereof. My thermostat is mounted within the shell of the sad iron and includes a casing C. The casing C is channel shaped, the web thereof being indicated at 10 and the flanges thereof at 12 and 14. At one end of the casing C, the web 10 is bent down as at 15 to form an end member and then bent out again as at 16 to form a mounting ear in a plane substantially parallel to the web 10.

The web 10 has an upwardly depressed portion 17 at its other end adapted to loosely receive a central hub 18 of a first spacer indicated generally at 1. Second and third spacers 2 and 3 are also provided and these spacers may be made of porcelain, or similar material. Each spacer has in its lower surface a depression 19. The depressions 19 of the first and second spacers receive an upwardly depressed portion 20 of a square washer 21. The spacers 1, 2 and 3 are stacked to surround a tubular rivet 22.

Also stacked on the tubular rivet 22 are a pair of square washers of mica or the like, indicated at 23 and 24. The stack also includes an upper spring arm 25, a lower spring arm 26, an upper terminal strip 27 and a lower terminal strip 28. The terminal strips 27 and 28 are adapted to be connected to a terminal 29 and a wire 30, respectively (see Figure 1). Current supply wires 31 and 32 are connected to the terminal 29 and a terminal 33. The wire 30 connected to the terminal strip 28 and another wire 34 connected to the terminal 33 extend to the heating element (not shown) of the sad iron S.

The spring arms 25 and 26 extend from the tubular rivet 22 toward the opposite end of the casing C and carry contacts 35 and 36, respectively. In Figure 5, it will be noted that the spring arm 26 is narrower than the distance between the flanges 12 and 14 of the casing C so as not to be short circuited thereby. To retain them in this position by preventing rotation of the spring arms on the tubular rivet, the casing C has a pair of openings 37 to receive prongs 38 extending upwardly from the first spacer 1. Similar prongs extend upwardly from the spacers 2 and 3 and enter sockets 39 therefor in the spacers 1 and 2. The spring arms 25 and 26 each have notches indicated at 40 to receive the prongs 38 of the spacers 2 and 3. Thus the entire assembly of parts 3, 26, 2, 25, and 1 is held against rotation relative to the web 10 of the casing C. The hubs 19 insulate the spring arms 25 and 26 from the tubular rivet 22 which is grounded, and the terminal strips 27 and 28 are provided with eyes large enough to surround the hubs 18 and thereby prevent grounding contact. The insulating washer 24 is also provided with a pair of openings 41 to receive the prongs 38 of the spacer 1.

An adjusting screw 42 is provided for my thermostat which has an insulating tip 43 on its lower end and an adjusting knob 44 on its upper end. The knob 44 may be of insulating material secured as by screws 45 to a washer 46. The washer 46 has a stop lug 47 extending downwardly therefrom and adapted to engage a stop lug 48 in the minimum position of the knob. The stop lug 48 is formed on a plate 49 supported on the shell of the sad iron, with a bore at 50 serving as a bearing for the adjusting screw 42.

The spring arm 26 is provided with an insulating button 51 with which a bimetal element 52 is adapted to engage and with which also a stop screw 53 is adapted to engage. The bimetal element 52 is mounted against the lower surface of the mounting ear 16 or between the surface of the sole plate S' and the mounting ear. A screw 54 extends through the ear and the bimetal element and is threaded into the sole plate to mount the end of the casing C having the ear 16. To prevent rotation of the bimetal element on the screw 54 and consequent binding, the bimetal element is provided with a notch 55 coacting with a lug 56 of the ear 16. The bimetal element is also notched at 57 to clear the stop screw 53. The stop screw 53 is threaded through the web 10 of the casing C and has a spring 58 under its head to retain it in any adjusted position.

The adjusting screw 42 is threaded into a nut 59 which is mounted on the web 10 of the casing C by passage through an opening 60 thereof and a spinning operation performed at 61 on the lower end of the nut to retain it in position. The end of the casing C opposite the screw 54 is retained on the sole plate S' by a screw 62, which extends through the tubular rivet 22.

*Factory adjustment and practical operation.*

In the operation of my thermostat, the parts shown exploded in Figure 2 are assembled together, which includes the operation of stacking the elements shown in Figure 4 on the tubular rivet 22 and spinning the lower edge into the upwardly depressed portion 20 of the washer 21. After the operating range of the thermostat is determined, the knob 44 is secured in the proper position of rotation with respect to the adjusting screw 42 and then rotated to the stopped position shown in Figure 1, with the lug 47 engaging the lug 48. This position is also shown in Figure 4. The stop screw 53 is then adjusted so that the contact 36 is just separated from the contact 35. Thereafter, the knob 44 may be adjusted to various settings, and whenever it is returned to the stopped or "off" position the thermostat contacts will be separated.

In Figure 3, the adjusting screw 42, it will be noted, has been adjusted to a lower position than the "off" position of Figure 4, so that when the bimetal element 52 is cold the contact 35 is engaged with the contact 36 and the spring arms 25 and 26 assume a predetermined position, depending upon the setting of the knob 44. Consequently, when the bimetal element 52 is heated it will assume a position such as shown in this figure to engage the insulating button 51 and spring the arm 26 downwardly for separating the circuit controlling contacts. The position of the arm 26 as determined by the setting of the knob 44 will determine the degree of travel of the thermostat from cold to circuit opening position, and thus circuit opening may be effected at various desired temperatures affecting the bimetal element.

The parts of my thermostat, after being formed, may be readily and quickly assembled with relation to each other with a minimum of time and operations. The thermostat can be subsequently quickly adjusted for the desired temperature range and for the "off" position. The thermostat is so constructed as to intimately associate the temperature responsive element with the heated surface it is desirable to control. The metal casing C aids in heat transfer from the sole plate to the bimetal element by radiation from points entirely surrounding the bimetal element, as well as by conduction from the sole plate directly to the bimetal element.

I have illustrated and described my improvement in an embodiment which I have found very satisfactory. I have not attempted to illustrate or describe certain adaptations or modifications which I contemplate, or the various uses and adjustments possible, as it is believed that the foregoing disclosure will enable those skilled in the art to which this invention appertains to embody or adapt my improvements as may be desired.

Having thus described my invention, I now claim and desire to secure by Letters Patent:

1. A thermostat structure comprising a channel shaped casing having its web turned down at one end and spanning the distance between the flanges of the casing and terminating in a mounting ear located in a plane substantially parallel to the web of the casing, a pair of spring arms, a contact carried by each spring arm, means adjacent the other end of said casing for mounting said spring arms so that they are biased to disengage each other comprising a tubular rivet, said spring arms having enlarged openings to receive said tubular rivet, a first spacer between the web of said casing and one of said spring arms, a second spacer between said spring arms, a third spacer below the other spring arm, said spacers having central hubs receiving the openings of said spring arms and prongs located spaced from said hubs, said spring arms and the web of said casing having openings to receive said prongs for positioning said spring arms against rotation on said tubular rivet, a screw through said tubular rivet entering a surface from which heat is received to operate the thermostat, an adjusting nut secured to the web of said casing, an adjusting screw threaded therein and engaging said one of said spring arms to effect engagement of the contact thereof with the contact of said other spring arm, a bimetal element for moving said other spring arm away from said one spring arm when the bimetal element is warped by heat, said bimetal element being mounted against said ear, a screw through said ear and said bimetal element into said surface from which heat is received, said other spring arm carrying an insulating button for engagement by said bimetal element to separate the contact of said other spring arm from the contact of said one spring arm at the operating point of the thermostat, and a stop screw threaded through said web of said casing and engaged by said insulating button to permit separation of the contact of said one spring arm from the contact of said one spring arm when said adjusting screw is adjusted to a minimum position, said bimetal element being notched to clear said stop screw and a spring being provided under the head of said stop screw to retain it in its adjusted position.

2. A thermostat structure comprising a pair of spring arms, a contact carried by each spring arm, means adjacent the one end of said casing for mounting said spring arms therein so that they are biased to disengage each other comprising a tubular rivet, said spring arms having enlarged openings to receive said tubular rivet, a first spacer between said casing and one of said spring arms, a second spacer between said spring arms, a third spacer below the other spring arm, said spacers having central hubs receiving the openings of said spring arms and prongs located spaced from said hubs, said spring arms and said casing having openings to receive said prongs for positioning said spring arms against rotation on said tubular rivet, an adjusting nut secured to said casing, an adjusting screw threaded therein and engaging said one of said spring arms to effect engagement of the contact thereof with the contact of said other spring arm, a bimetal element for moving said other spring arm away from said one spring arm when the bimetal element is warped by heat, said other spring arm carrying an insulating button for engagement by said bimetal element to separate the contact of said other spring arm from the contact of said one spring arm at the operating point of the thermostat when the bimetal element is warped by heat, and a stop screw carried by said casing and engaged by said insulating button to permit separation of the contact of said one spring arm from the contact of said other spring arm when said adjusting screw is adjusted to a minimum position, and a spring under the head of said adjusting screw to retain it in its adjusted position.

3. In a thermostat structure, a channel shaped casing having a mounting ear at one end thereof, a pair of spring arms, a contact carried by each spring arm, means adjacent the other end of said casing for mounting said spring arms comprising a tubular rivet, said spring arms having enlarged openings to receive said tubular rivet, a first spacer between the web of said casing and one of said spring arms, a second spacer between said spring arms, a third spacer below the other spring arm, said spacers having central hubs receiving the openings of said spring arm and prongs located spaced from said hubs, said spring arms and the web of said casing having openings to receive said prongs for positioning said spring arms against rotation on said tubular rivet, a screw through said tubular rivet entering a surface from which heat is received to operate the thermostat, an adjusting nut, an adjusting screw threaded therein and engaging said one of said spring arms to effect engagement of the contact thereof with the contact of said other spring arm, a bimetal element for moving said other spring arm away from said one spring arm when the bimetal element is warped by heat, said bimetal element being mounted against said ear, a screw through said ear and said bimetal element into said surface from which heat is received, said other spring arm carrying an insulating button for engagement by said bimetal element to separate the contact of said other spring arm from the contact of said one spring arm at the operating point of the thermostat, and a stop screw threaded through said casing and engaging said insulating button to permit separation of the contact of said one spring arm from the contact of said other spring arm when said adjusting screw is adjusted to a minimum position, said bimetal element being notched to clear said stop screw.

4. A thermostat structure comprising a channel shaped casing having its web turned down at one end in a mounting ear, a pair of spring arms, a contact carried by each spring arm, means adjacent the other end of said casing for mounting said spring arms so that they are biased to disengage each other comprising a rivet, said spring arms having enlarged openings to receive said rivet, a first spacer between the web of said casing and one of said spring arms, a second spacer between said spring arms, a third spacer below the other spring arm, said spacers having central hubs receiving the openings of said spring arms, means for preventing rotation of said spring arms on said rivet, an adjusting nut secured to the web of said casing, an adjusting screw threaded therein and engaging said one of said spring arms to effect engagement of the contact thereof with the contact of said other spring arm, a bimetal element for moving said other spring arm away from said one spring arm when the bimetal element is warped by heat, said bimetal element being mounted against said ear, said other spring arm carrying an insulating button for engagement by said bimetal element to separate the contact of said other spring arm from the contact of said one spring arm at the operating point of the thermostat, and a stop screw engaging said insulating button to separate the contact of said other spring arm from the contact of said one spring arm when said adjusting screw is adjusted to a minimum position.

5. A thermostat structure comprising a casing, a pair of spring arms, a contact carried by each spring arm, means for mounting said spring arms so that they are biased to disengage each other comprising a single assembly element, said spring arms having enlarged openings to receive said assembly element, a first spacer between a wall of said casing and one of said spring arms, a second spacer between said spring arms, a third spacer below the other spring arm, said spacers having central hubs receiving the openings of said spring arms and having integral prongs located spaced from said hubs, said spring arms and said casing having openings to receive said prongs for positioning said spring arms against rotation on said single assembly element, an adjusting nut secured to said casing, an adjusting screw threaded therein and engaging said one of said spring arms to effect engagement of the contact thereof with the contact of said other spring arm, and a bimetal element for moving said other spring arm away from said one spring arm when the bimetal element is warped by heat.

6. A thermostat structure comprising a channel shaped casing having its web turned down at one end and spanning the distance between the flanges of the casing and terminating in a mounting ear, a pair of spring arms, a contact carried by each spring arm, means adjacent the other end of said casing for mounting said spring arms so that they are biased to disengage each other comprising a tubular rivet, said spring arms having enlarged openings to receive said tubular rivet, a first spacer between the web of said casing and one of said spring arms, a second spacer between said spring arms, a third spacer below the other spring arm, a screw through said tubular rivet entering a surface from which heat is received to operate the thermostat, an adjusting nut secured to the web of said casing, an adjusting screw threaded therein and engaging said one of said spring arms to effect engagement of the contact thereof with the contact of said other spring arm, a bimetal element for moving said other spring arm away from said one spring arm when the bimetal element is warped by heat, said bimetal element being mounted against said ear, a screw through said ear and said bimetal element into said surface from which heat is received, and a stop screw threaded through said web of said casing and engaging said other spring arm to separate the contact thereof from the contact of said one spring arm when said adjusting screw is adjusted to a minimum position, said bimetal element being notched to clear said stop screw.

KENNETH B. DAFFORN.